United States Patent
Irie (10) Patent No.: US 8,162,795 B2
(45) Date of Patent: Apr. 24, 2012

(54) DRIVING FORCE CONTROL APPARATUS FOR HYBRID VEHICLE

(75) Inventor: Yoshiaki Irie, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 448 days.

(21) Appl. No.: 12/525,682

(22) PCT Filed: Feb. 4, 2008

(86) PCT No.: PCT/JP2008/051743
§ 371 (c)(1),
(2), (4) Date: Aug. 4, 2009

(87) PCT Pub. No.: WO2008/096698
PCT Pub. Date: Aug. 14, 2008

(65) Prior Publication Data
US 2010/0022347 A1  Jan. 28, 2010

(30) Foreign Application Priority Data
Feb. 8, 2007 (JP) ................................. 2007-029076

(51) Int. Cl.
*B60W 10/04* (2006.01)
(52) U.S. Cl. .............................................. 477/3; 477/20
(58) Field of Classification Search .................. 477/3, 5, 477/6, 15, 18, 20
See application file for complete search history.

(56) References Cited

U.S. PATENT DOCUMENTS

| 6,401,016 | B1 * | 6/2002 | Yoshino et al. | 701/22 |
| 6,971,968 | B2 * | 12/2005 | Imazu et al. | 477/2 |
| 7,917,277 | B2 * | 3/2011 | Tabata et al. | 701/99 |
| 2002/0056332 | A1 * | 5/2002 | Suzuki | 74/335 |
| 2005/0272555 | A1 * | 12/2005 | Tabata et al. | 477/2 |

FOREIGN PATENT DOCUMENTS

| JP | 2004 153946 | 5/2004 |
| JP | 2005 248714 | 9/2005 |
| JP | 2005-344917 | 12/2005 |
| JP | 2006 129584 | 5/2006 |
| JP | 2006 217750 | 8/2006 |

\* cited by examiner

*Primary Examiner* — Ha D. Ho
(74) *Attorney, Agent, or Firm* — Oblon, Spivak, McClelland, Maier & Neustadt, L.L.P.

(57) ABSTRACT

In a driving force control apparatus for a hybrid vehicle, it is configured that an engine ECU (22) can set a target engine rotational number by using a fuel consumption optimal operation-line based on an operating state of the hybrid vehicle, a main ECU (28) can set target output torque of an engine (11) and an electric motor (12) based on the operating state of the hybrid vehicle and the target engine rotational number, and the engine ECU (22) and a motor ECU (27) can control the engine (11) and the electric motor (12) based on the target engine rotational number and the target output torque, and when there is a torque down command in the main ECU (28), the engine ECU (22) sets the target engine rotational number to be higher than the target engine rotational number set by using the fuel consumption optimal operation-line, thereby improving followability of torque up control after torque down control to improve controllability.

2 Claims, 4 Drawing Sheets

DRIVING FORCE CONTROL APPARATUS FOR HYBRID VEHICLE

TECHNICAL FIELD

The present invention relates to a driving force control apparatus for a hybrid vehicle capable of traveling with an engine and an electric motor as power sources.

BACKGROUND ART

Recently, it is suggested the hybrid vehicle equipped with the engine for outputting torque by combustion of fuel and the electric motor for outputting torque by supply of electric power and is capable of traveling by transmitting the torque of the engine and the electric motor to wheels. Such hybrid vehicle is configured to drive the wheels only by the torque of the electric motor or to drive the wheels by the torque of the engine and the electric motor by controlling drive and stop of the engine and the electric motor according to an operating state thereof, and the electric motor may be driven by the electric power accumulated in a battery, and when energy of the battery decreases, the engine is driven to charge the battery.

That is to say, in the hybrid vehicle, the engine and the electric motor are provided as driving force sources, and a planetary gear for synthesizing the power of the engine and the electric motor to transmit to the wheels is provided. Specifically, an output shaft of the engine is coupled to a carrier of the planetary gear, and an output shaft of the electric motor is coupled to a ring gear of the planetary gear, and it is configured that the power is transmitted from a sprocket coupled to the ring gear to the wheels. In addition, an electric generator is provided between the planetary gear and the engine and a rotational shaft of the electric generator is coupled to a sun gear of the planetary gear. Therefore, the power of the engine is divided to the wheels and the electric generator by the planetary gear, so that a rotational speed of the engine may be controlled by controlling a rotational speed of the electric generator. That is to say, a power dividing mechanism composed of the planetary gear has a function to convert the rotational speed of the engine and a function to divide the power of the engine to the wheels and the electric generator.

In the hybrid vehicle thus configured, in order to improve efficiency of the engine, the engine rotational number for driver required torque is determined by using an optimal fuel consumption operation-line determined by the engine rotational number and the engine torque. Such hybrid vehicle is disclosed in the following patent document 1.

The hybrid vehicle disclosed in the patent document 1 is equipped with a hybrid drive system having a Ravigneaux-type composite planetary gear train coupled so as to be in the order of rotational speed of a first motor generator, the engine, an output gear and a second motor generator in an alignment chart, and sets a gear ratio such that an operation point of the engine is on an optimal fuel consumption line, and when one of motor rotational speeds calculated based on a gear ratio setting is judged to be overspeed, this corrects the engine rotational number to decrease the motor rotational speed.
Patent Document 1: JP-A-2004-153946

DISCLOSURE OF INVENTION

Problem to be Solved by the Invention

Although the engine torque and the motor torque are divided based on the required torque of the driver in the hybrid vehicle of the above-described patent document 1, when the traveling torque is decreased due to intervention of traction (slip) control and stability (skid) control of the drive wheels, the target engine rotational number is set by using the optimal fuel consumption operation-line, so that the engine rotational number decreases with the decrease in the traveling torque. Thereafter, the traction control and the stability control of the driving wheels are terminated and it is tried to increase the engine rotational number in order to increase the traveling torque, responsiveness decreases by as much as inertia, so that it takes a long time to increase an actual engine rotational number to a target engine rotational number, and there is a problem that controllability decreases and the vehicle behavior might be deteriorated.

Figure 5:
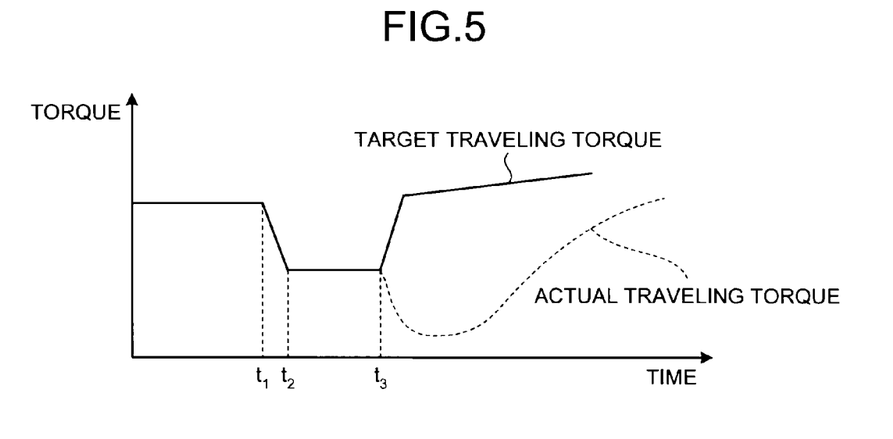
FIG. 5 is a graph illustrating target traveling torque and actual traveling torque in the conventional hybrid vehicle.
Figure 6:
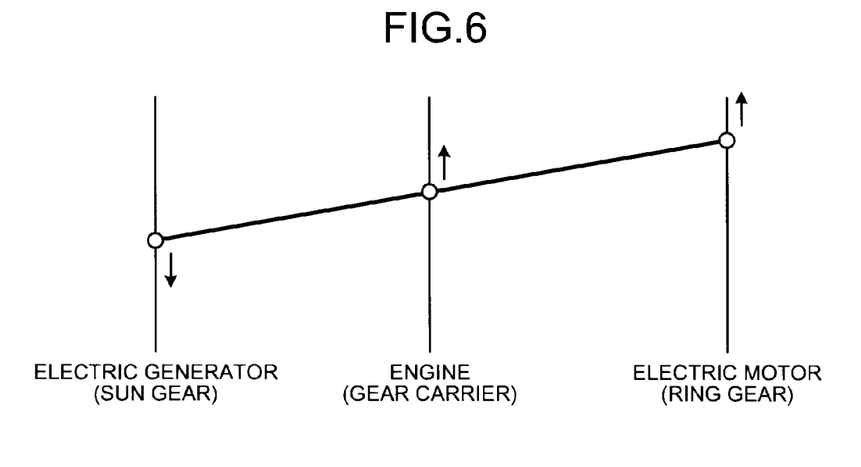
FIG. 6 is an alignment chart illustrating torque of an electric generator, an engine and an electric motor in the conventional hybrid vehicle.

Hereinafter, this phenomenon is specifically described. FIG. 5 is a graph illustrating target traveling torque and actual traveling torque in the conventional hybrid vehicle, and FIG. 6 is an alignment chart illustrating the torque of the electric generator, the engine and the electric motor in the conventional hybrid vehicle.

In the conventional hybrid vehicle, as shown in FIG. 5, while this travels, when the drive wheels slip and the traction control is started to decrease the target traveling torque at a time point $t_1$, the engine rotational number is decreased in order to use the target engine rotational number by using the optimal fuel consumption operation-line. Then, when the slip of the drive wheels is resolved and the traction control is terminated at a time point $t_2$, the engine rotational number is increased so as to increase the target traveling torque at a time point $t_3$. However, when the engine rotational number is increased, the energy is required due to need to control the inertia, so that torque up responsiveness decreases. That is to say, as shown in FIG. 6, when a torque up command is issued, it is wanted to increase the engine rotational number, but the engine rotational number does not increase immediately due to existence of the inertia. Therefore, although the engine rotational number is easily increased by decreasing a power generation load of the electric generator by the engine, the torque of the electric motor decreases due to the decrease in an amount of charge by the electric generator, so that the traveling torque does not sufficiently increase consequently, and as shown in FIG. 5, it takes a long time for the actual traveling torque to increase to the target traveling torque.

The present invention is to solve such a problem, and an object thereof is to provide the driving force control apparatus for the hybrid vehicle in which the controllability is improved by improving followability of the torque up control after the torque down control.

Means for Solving Problem

In order to solve the above problems, and to achieve the object, a driving force control apparatus for a hybrid vehicle according to the present invention includes, in a hybrid vehicle capable of traveling with an engine and an electric motor as power sources, target engine rotational number setting means that sets a target engine rotational number by using a fuel consumption optimal operation-line set in advance based on an operating state of the vehicle; torque setting means that sets target output torque of the engine and the electric motor based on the operating state of the vehicle and the target engine rotational number; and torque controlling means that controls the engine and the electric motor based on the target engine rotational number and the target output torque, wherein when there is a torque down command in the torque setting means, the target engine rotational number setting means sets the target engine rotational number so as to be higher than the target engine rotational number set by using the fuel consumption optimal operation-line.

A driving force control apparatus for a hybrid vehicle according to the present invention includes, in a hybrid vehicle capable of traveling with an engine and an electric motor as power sources, target engine rotational number setting means that sets a target engine rotational number by using a fuel consumption optimal operation-line set in advance based on an operating state of the vehicle; torque setting means that sets target output torque of the engine and the electric motor based on the operating state of the vehicle and the target engine rotational number; and torque controlling means that controls the engine and the electric motor based on the target engine rotational number and the target output torque, wherein when there is a torque down command in the torque setting means, a setting process of the target engine rotational number using the fuel consumption optimal operation-line by the target engine rotational number setting means is prohibited.

In the driving force control apparatus for the hybrid vehicle according to the present invention, when there is the torque down command in the torque setting means, the target engine rotational number setting means sets the target engine rotational number within a range set in advance.

In the driving force control apparatus for the hybrid vehicle according to the present invention, when there is the torque down command in the torque setting means, the target engine rotational number setting means maintains a current target engine rotational number.

In the driving force control apparatus for the hybrid vehicle according to the present invention, when there is the torque down command during slip preventing control of driving wheels, the target engine rotational number setting means sets the target engine rotational number so as to be higher than the target engine rotational number set by using the fuel consumption optimal operation-line, or the setting process of the target engine rotational number using the fuel consumption optimal operation-line by the target engine rotational number setting means is prohibited.

In the driving force control apparatus for the hybrid vehicle according to the present invention, when there is the torque down command during skid preventing control of driving wheels, the target engine rotational number setting means sets the target engine rotational number so as to be higher than the target engine rotational number set by using the fuel consumption optimal operation-line, or the setting process of the target engine rotational number using the fuel consumption optimal operation-line by the target engine rotational number setting means is inhibited.

Effect of the Invention

In the driving force control apparatus for the hybrid vehicle according to the present invention, the target engine rotational number setting means that sets the target engine rotational number using the fuel consumption optimal operation-line based on the operating state of the vehicle, the torque setting means that sets the target output torque of the engine and the electric motor based on the operating state of the vehicle and the target engine rotational number, and the torque controlling means that controls the engine and the electric motor based on the target engine rotational number and the target output torque are provided, and when there is the torque down command in the torque setting means, the target engine rotational number setting means sets the target engine rotational number so as to be higher than the target engine rotational number set by using the fuel consumption optimal operation-line, so that the actual engine rotational number is not decreased at that time, the maximum value of the output torque of the vehicle, which may be output, becomes larger, and the followability of the torque up control after the torque down control is improved, thereby improving the controllability.

Also, according to the driving force control apparatus for the hybrid vehicle of the present invention, when there is the torque down command in the torque setting means, the setting process of the target engine rotational number using the fuel consumption optimal operation-line by the target engine rotational number setting means is prohibited, so that the actual engine rotational number is not decreased at that time, the maximum value of the output torque of the vehicle, which may be output, becomes larger, and the followability of the torque up control after the torque down control is improved, thereby improving the controllability.

EXPLANATIONS OF LETTERS OR NUMERALS 11 engine
12 electric motor
13 electric generator
14 power dividing mechanism (planetary gear unit)
15 drive wheel
17 drive shaft
18 inverter
19 battery
22 engine ECU (target engine rotational number setting means, torque controlling means)
27 motor ECU (torque controlling means)
28 main ECU (torque setting means)
29 battery ECU

BEST MODE(S) FOR CARRYING OUT THE INVENTION

Hereinafter, an embodiment of a driving force control apparatus for a hybrid vehicle according to the present invention is described in detail with reference to drawings. Meanwhile, the present invention is not limited by the present embodiment.

Embodiment

Figure 1:
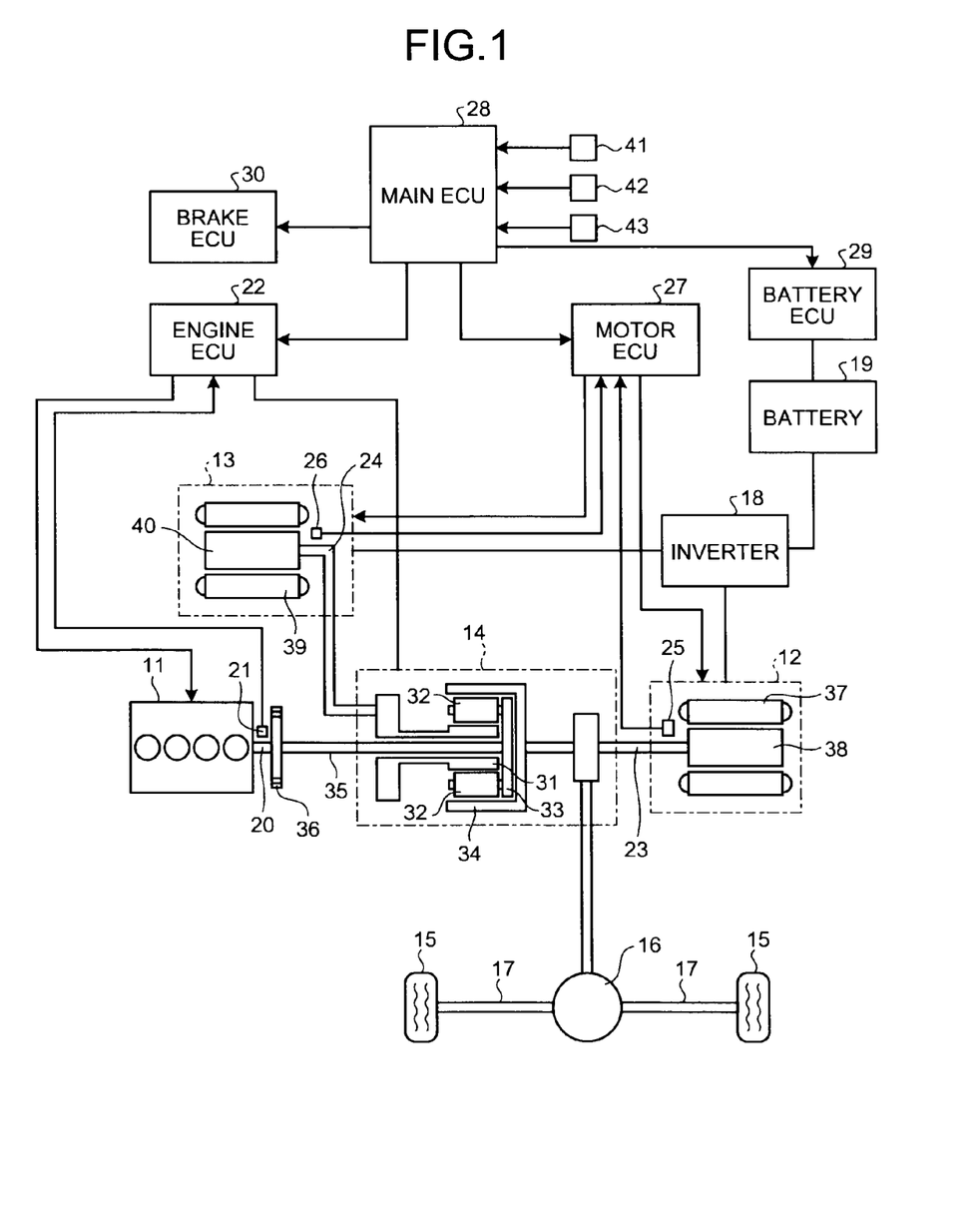
FIG. 1 is a schematic configuration diagram of a driving force control apparatus for a hybrid vehicle according to one embodiment of the present invention.
Figure 2:
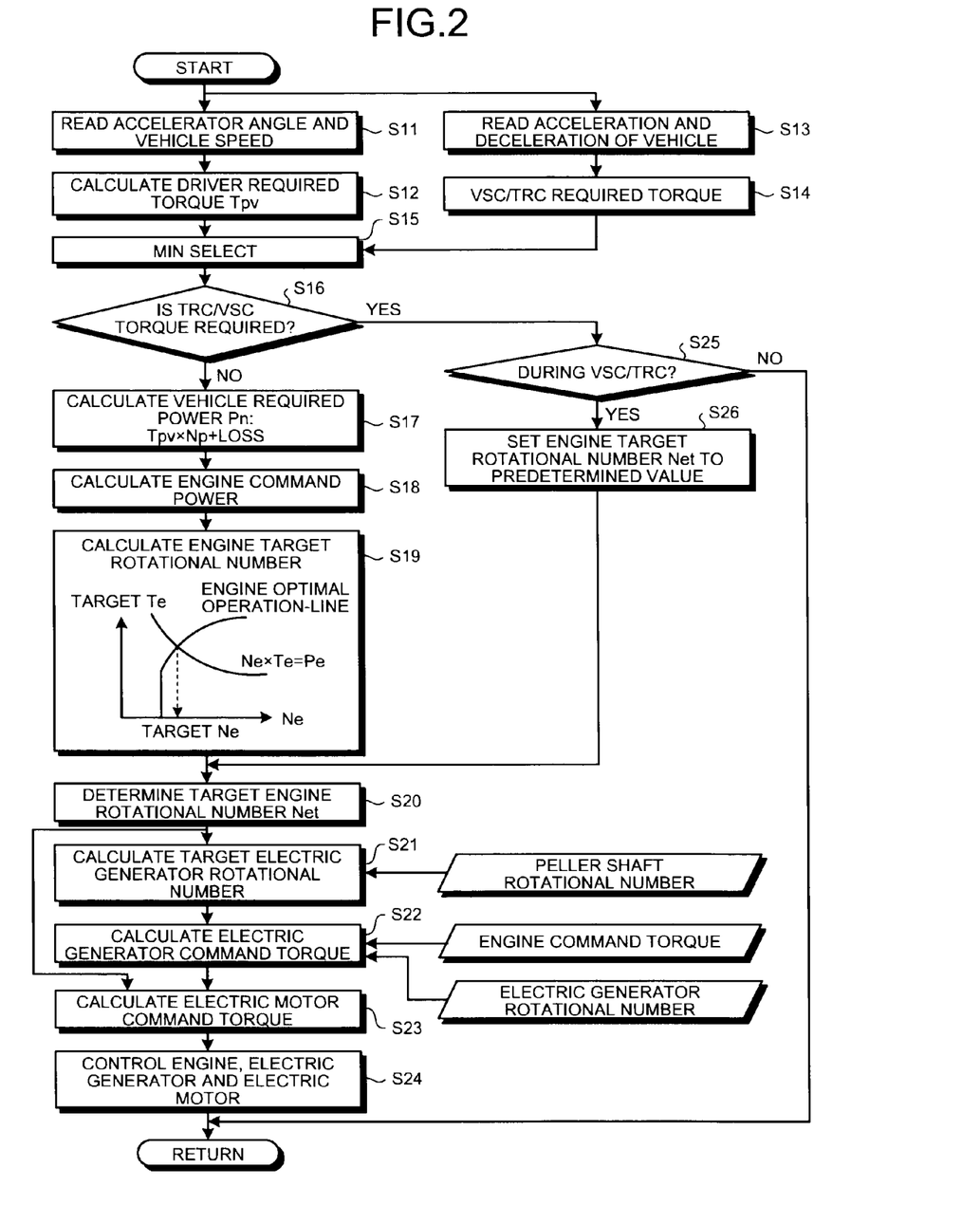
FIG. 2 is a flowchart illustrating driving force control in the driving force control apparatus for the hybrid vehicle according to the present embodiment.
Figure 3:
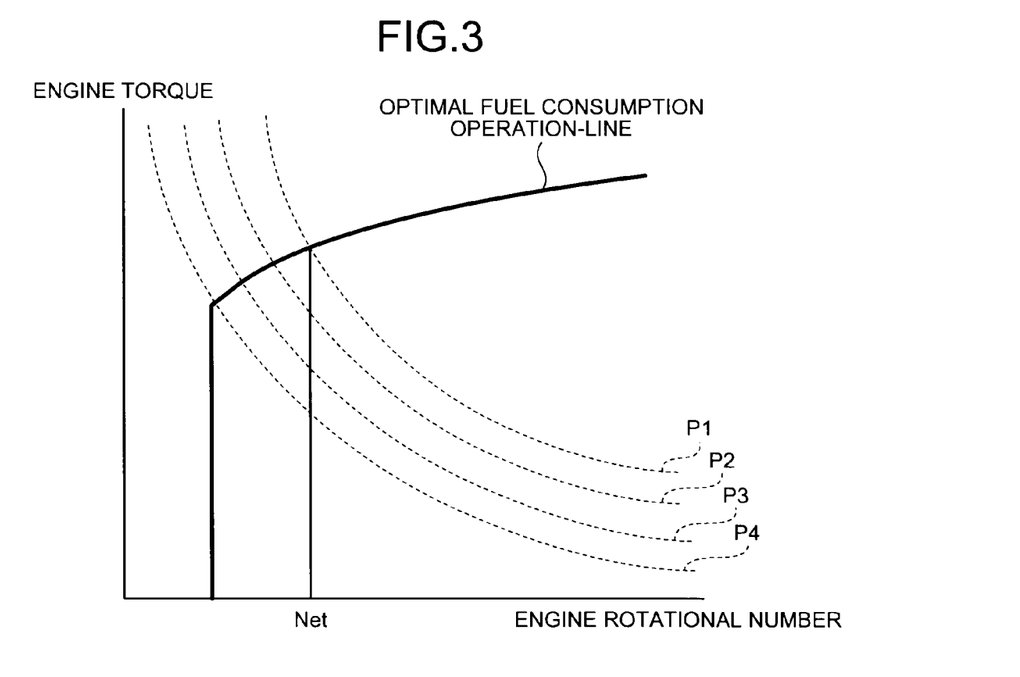
FIG. 3 is a map for setting a target engine rotational number in the driving force control apparatus for the hybrid vehicle according to the present embodiment.
Figure 4:
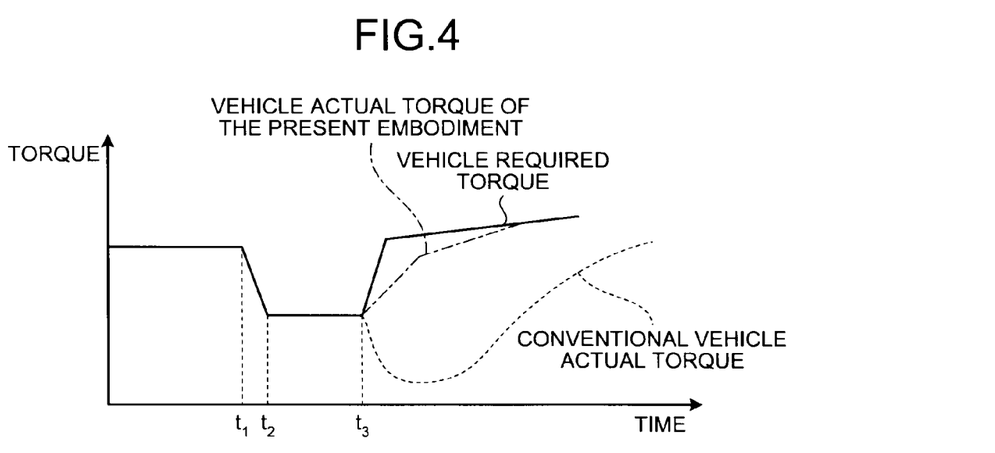
FIG. 4 is a graph illustrating target traveling torque and actual traveling torque in the driving force control apparatus for the hybrid vehicle according to the present embodiment.

FIG. 1 is a schematic configuration diagram of the driving force control apparatus for the hybrid vehicle according to one embodiment of the present invention, FIG. 2 is a flowchart illustrating driving force control in the driving force control apparatus for the hybrid vehicle according to the present embodiment, FIG. 3 is a map for setting a target engine rotational number in the driving force control apparatus for the hybrid vehicle according to the present embodiment, and FIG. 4 is a graph illustrating target traveling torque and actual traveling torque in the driving force control apparatus for the hybrid vehicle according to the present embodiment.

In the hybrid vehicle according to the present embodiment, as shown in FIG. 1, the vehicle is equipped with an engine 11 and an electric motor (motor generator) 12 as power sources, and the vehicle is also equipped with an electric generator (motor generator) 13 for receiving an output of the engine 11 to generate electric power. The engine 11, the electric motor 12 and the electric generator 13 are connected by a power dividing mechanism 14. The power dividing mechanism 14 divides the output of the engine 11 to the electric generator 13 and drive wheels 15, transmits an output from the electric motor 12 to the drive wheels 15, and serves as a transmission relating to the driving force transmitted from a drive shaft 17 to the drive wheels 15 through a decelerator 16.

The electric motor 12 is an alternating-current synchronous motor and is driven by alternating-current power. An inverter 18 is for converting electric power accumulated in a battery 19 from direct current to alternating current to supply to the electric motor 12, and for converting electric power generated by the electric generator 13 from alternating current to direct current to accumulate in the battery 19. The electric generator 13 basically has a configuration substantially similar to that of the above-described electric motor 12, and has a configuration as the alternating-current synchronous motor. In this case, the electric motor 12 mainly outputs the driving force, on the other hand, the electric generator 13 mainly receives the output of the engine 11 to generate electric power.

In addition, although the electric motor 12 mainly generates the driving force, this may also generate electric power by utilizing rotation of the drive wheels 15 (regenerative power generation), and may also serve as the electric generator. At that time, a brake (regenerative brake) acts on the drive wheels 15, so that it is possible to brake the vehicle by using the same together with a foot brake and an engine brake. On the other hand, although the electric generator 13 mainly receives the output of the engine 11 to generate electric power, this may also serve as a motor driven by receiving the electric power of the battery 19 through the inverter 18.

A crank position sensor 21 for detecting a crank angle is provided on a crankshaft 20 of the engine 11. The crank position sensor 21 is connected to the engine ECU 22, and the engine ECU 22 calculates an engine rotational number based on the detected crank angle. Also, rotational number sensors 25 and 26 for detecting rotational numbers of drive shafts 23 and 24 are provided on the drive shafts 23 and 24 of the electric motor 12 and the electric generator 13, respectively. The rotational number sensors 25 and 26 are connected to a motor ECU 27 to output the detected rotational numbers of the drive shafts 23 and 24 to the motor ECU 27.

The above-described power dividing mechanism 14 is composed of a planetary gear unit. That is to say, the power dividing mechanism (planetary gear unit) 14 is composed of a sun gear 31, a plurality of planetary gears 32 arranged around the sun gear 31, a gear carrier 33 for holding the planetary gears 32, and a ring gear 34 arranged on a further outer peripheral portion of the planetary gears 32. The crankshaft 20 of the engine 11 is coupled to a central shaft 35 of the gear carrier 33 through a damper 26, and the output of the engine 11 is input to the gear carrier 33 of the planetary gear unit 14. Also, the electric motor 12 has a stator 37 and a rotor 38 therein, and the rotor 38 is coupled to the ring gear 34 through the drive shaft 23 and the rotor 38 and the ring gear 34 are coupled to the decelerator 16 through a gear unit not shown. The decelerator 16 is for transmitting the output input from the electric motor 12 to the ring gear of the planetary gear unit 14 to the drive shaft 17, and the electric motor 12 is in a state always connected to the drive shaft 17.

Also, the electric generator 13 has a stator 39 and a rotor 40 therein just like the above-described electric motor 12, and the rotor 40 is coupled to the sun gear 31 through the drive shaft 24 and a gear unit not shown. That is to say, the output of the engine 11 is divided by the planetary gear unit 14 and is input to the rotor 40 of the electric generator 13 through the sun gear 31. Also, the output of the engine 11 is divided by the planetary gear unit 14 and can be transmitted to the drive shaft 17 through the ring gear 34 or the like.

Then, by controlling rotation of the sun gear 31 by controlling electric power generation of the electric generator 13, an entire planetary gear unit 14 can be used as a stepless transmission. That is to say, the output of the engine 11 or the electric motor 12 is output to the drive shaft 17 after speed changed by the planetary gear unit 14. Also, it is possible to control the rotational number of the engine 11 by controlling the electric power generation of the electric generator 13 (power consumption when this serves as the electric motor). Meanwhile, when controlling the rotational numbers of the electric motor 12 and the electric generator 13, the control is performed by controlling the inverter 18 by the motor ECU 27 by referring to the outputs of the rotational number sensors 25 and 26, and the rotational number of the engine 11 can also be controlled thereby.

The above-described various controls are controlled by a plurality of electronic control units (ECUs). Drive by the engine 11 and the drive by the electric motor 12 and the electric generator 13, which are characteristic as the hybrid vehicle, are comprehensively controlled by a main ECU 28. That is to say, for a required output (required torque) of a driver, distribution of the output of the engine 11 and the output by the electric motor 12 and the electric generator 13 is determined by the main ECU 28 according to a traveling state of the vehicle, and each control command is output to the engine ECU 22 and the motor ECU 27 in order to control the engine 11, the electric motor 12 and the electric generator 13.

In addition, the engine ECU 22 and the motor ECU 27 output information of the engine 11, the electric motor 12 and the electric generator 13 also to the main ECU 28. The main ECU 28 is also connected to a battery ECU 29 for controlling the battery 19 and a brake ECU 30 for controlling the brake. The battery ECU 29 observes a state of charge of the battery 19, and when an amount of charge runs short, this outputs a charge request command to the main ECU 28. The main ECU 28, which receives the charge request, performs control to allow the electric generator 13 to generate electric power so as to charge the battery 19. The brake ECU 30 manages braking of the vehicle, and controls the regenerative brake by the electric motor 12 together with the main ECU 28.

Since the hybrid vehicle of the first embodiment is configured as described above, it is possible to satisfy the output required by an entire vehicle while controlling an operating state of the engine 11 to a desired operating state, by dividing the output (torque) required by the entire vehicle to the engine 11 and the electric motor 12 (electric generator 13) while the vehicle travels. In this case, the hybrid vehicle calculates the required torque based on accelerator opening corresponding to a depression amount of an accelerator pedal by the driver and a vehicle speed (rotational number of the drive shaft), and performs operation control of the engine 11, the electric motor 12 and the electric generator 13 such that required power corresponding to the required torque is output.

In the driving force control of such hybrid vehicle, there are a torque conversion operating mode, a charge/discharge operating mode and a motor operating mode as the operation control of the engine 11, the electric motor 12 and the electric generator 13.

For example, the torque conversion operating mode is the operating mode for performing the operation control of the engine 11 such that the power corresponding to the required power is output from the engine 11, and for drive-controlling the electric motor 12 and the electric generator 13 such that entire power output from the engine 11 is torque-converted by the power dividing mechanism 14, the electric motor 12 and the electric generator 13 to be output to the drive wheels 15.

The charge/discharge operating mode is the operating mode for performing the operation control of the engine 11 such that the power corresponding to a sum of the required power and the electric power required for charging and discharging the battery 19 is output from the engine 11, and for drive-controlling the electric motor 12 and the electric generator 13 such that the entire or a part of the power output from the engine 11 with the charging and discharging of the battery 19 is torque-converted by the power dividing mechanism 14, the electric motor 12 and the electric generator 13, and the required power is output to the drive wheels 15.

The motor operating mode is the operating mode for performing the operation control to stop the operation of the engine 11 and output the power corresponding to the required power from the electric motor 12 to the drive wheels 15.

As described above, the required output necessary for the travel of the hybrid vehicle is set based on the required torque of the driver, and the required output is divided to the output of the engine 11 and the output of the electric motor 12. However, in the hybrid vehicle, the required torque for traction (slip) control and stability (skid) control of the drive wheels 15 is set for the required torque of the driver. Therefore, in a state in which the required output set based on the required torque of the driver is divided to the output of the engine 11 and the output of the electric motor 12, and the hybrid vehicle travels by controlling the engine 11 and the electric motor 12 based on the engine output and the motor output, for example, when a slip of the drive wheel 15 occurs, the main ECU 28 adopts the required torque of the traction control or the stability control in place of the required torque of the driver. That is to say, the main ECU 28 sets the target engine rotational number of the engine 11 by using an optimal fuel consumption operation-line to decrease the engine output due to the need to decrease the required output of the hybrid vehicle by decreasing the required torque in order to inhibit the slip.

However, when it is tried to increase the engine rotational number depending on increase in the required output of the hybrid vehicle set based on the required torque of the driver from a state in which the slip is inhibited by decreasing the engine output and the traction control or the stability control is terminated, responsiveness decreases by as much as inertia, so that it takes a long time to increase an actual engine rotational number to the target engine rotational number and to increase an actual travel output to the required output.

Therefore, in the driving force control apparatus for the hybrid vehicle according to the present embodiment, target engine rotational number setting means that sets the target engine rotational number by using the fuel consumption optimal operation-line set in advance based on the operating state of the hybrid vehicle, torque setting means that sets target output torque of the engine 11 and the electric motor 12 based on the operating state of the hybrid vehicle and the target engine rotational number, and torque controlling means that controls the engine 11 and the electric motor 12 based on the target engine rotational number and the target output torque are provided. In this case, the engine ECU 22 is applied as the target engine rotational number setting means, the main ECU 28 is applied as the torque setting means, and the engine ECU 22 and the motor ECU 27 are applied as the torque controlling means.

When there is a torque down command in the main ECU (torque setting means) 28, the engine ECU (target engine rotational number setting means) 22 sets the target engine rotational number so as to be higher than the target engine rotational number set by using the fuel consumption optimal operation-line. Alternatively, a setting process of the target engine rotational number using the fuel consumption optimal operation-line is prohibited.

Specifically, the engine ECU 22 sets the target engine rotational number within a range set in advance when there is the torque down command by the traction control or the stability control. In this case, it is desirable that the engine ECU 22 maintains a current target engine rotational number.

Therefore, in the present embodiment, an accelerator opening sensor 41, a vehicle speed sensor 42, and an acceleration sensor 43 are connected to the main ECU 28. The accelerator opening sensor 41 detects the depression amount of the accelerator pedal depressed by the driver, that is to say, the accelerator opening, the vehicle speed sensor 42 calculates the vehicle speed from the rotational number (rotational speed) of the drive shaft 17 directly connected to the drive wheels 15, the acceleration sensor 43 detects acceleration and deceleration in the hybrid vehicle, and each detection result is input to the main ECU 28.

Herein, the drive control by the driving force control apparatus for the hybrid vehicle according to the present embodiment is described in detail with reference to the flowchart in FIG. 2.

In the drive control by the driving force control apparatus for the hybrid vehicle according to the present embodiment, as shown in FIG. 2, at a step S11, the main ECU 28 reads the accelerator opening detected by the accelerator opening sensor 41 and the vehicle speed (rotational number of the drive shaft 17) of the hybrid vehicle detected by the vehicle speed sensor 42. At a step S12, required torque Tpv of the driver is calculated based on the accelerator opening and the vehicle speed (rotational number of the drive shaft 17).

On the other hand, at a step S13, the main ECU 28 reads the acceleration and the deceleration of the hybrid vehicle detected by the acceleration sensor 43, and at a step S14, this estimates a road surface friction coefficient $\mu$ based on the acceleration and the deceleration and calculates required torque Tvt of the stability control (VSC) or the traction control (TRC) based on the estimated road surface friction coefficient $\mu$.

Then, at a step S15, a smaller one of the required torque Tpv of the driver and the required torque Tvt of the VSC/TRC is selected and is adopted. At a step S16, it is judged whether the required torque Tvt of the VSC/TRC is adopted at the step S15. Herein, when it is judged that the required torque Tpv of the driver is adopted, at a step S17, required power Ph of the hybrid vehicle is calculated based on the required torque Tpv of the driver, a rotational number Np of the drive shaft 17 and loss of friction or the like. Then, at a step S18, engine command power Pe is calculated based on the required power Ph of the hybrid vehicle. That is to say, the required power Ph of the hybrid vehicle is divided to the engine command power Pe and motor command power Pm. In this case, for example, the motor command power Pm is set based on the amount of charge of the battery 19, and the motor command power Pm is subtracted from the required power Ph of the hybrid vehicle to set the engine command power Pe.

At a step S19, the target engine rotational number and engine command torque are obtained by using the optimal fuel consumption operation-line based on the engine command power Pe. The optimal fuel consumption operation-line represents quantitative relationship to ensure the optimal fuel consumption in relationship between the engine rotational number and the engine torque as shown in FIG. 3, and a plurality of kinds of power lines P1 to P4 are set for the optimal fuel consumption operation-line. Therefore, for example, when the engine command power Pe corresponds to the power line P1, the engine rotational number and the engine torque at an intersection of the power line P1 and the optimal fuel consumption operation-line are a target engine rotational number Net and engine command torque Tet, respectively.

Then, at a step S20, the target engine rotational number Net is determined, at a step S21, a target electric generator rotational number of the electric generator 13 is calculated based on the target engine rotational number Net and the rotational number of the drive shaft 17, at a step S22, electric generator command torque of the electric generator 13 is calculated based on the target engine rotational number Net, the target electric generator rotational number, an actual electric generator rotational number and the engine command torque Tet, and at a step S23, motor command torque of the electric motor 12 is calculated based on the motor command power Pm. Then, at a step S24, the ECUs 22 and 27 control the engine 11, the electric motor 12 and the electric generator 13.

On the other hand, at the step S16, when it is judged that the required torque Tvt of the VSC/TRC is adopted at the step S15, at a step S25, it is judged whether it is during the VSC/TRC. That is to say, the required torque Tvt of the VSC/TRC is adopted as the required torque of the hybrid vehicle, and it is judged whether the VSC/TRC, that is to say, the torque down control due to the slip or skid of the drive wheels 15 is started. Herein, even when the required torque Tvt of the VSC/TRC is adopted as the required torque of the hybrid vehicle, when it is not during the torque down control at a time of slip of the drive wheels 15 by the VSC/TRC, the procedure terminates this routine without action.

On the other hand, when the required torque Tvt of the VCS/TRC is adopted as the required torque of the hybrid vehicle and the torque down control at the time of slip of the drive wheels 15 by the VSC/TRC is started, at a step S26, the target engine rotational number Net is set to a predetermined value. In this case, it is desirable to set a range to set the target engine rotational number Net and to set an upper limit value and a lower limit value within this range. For example, the upper limit value is set to +Ne1 and the lower limit value is set to ±0. That is to say, by applying +Ne1 as the upper limit value, the target engine rotational number Net is made higher than the target engine rotational number Net set on the fuel consumption optimal line. Also, by adopting ±0 as the lower limit value, a current target engine rotational number Net is maintained. This is similar to the case in which the setting process of the target engine rotational number using the fuel consumption optimal operation-line is prohibited.

Then, although the target engine rotational number Net is determined at the step S20, when the required torque Tvt of the VSC/TRC is adopted at the step S15 and it is judged that the torque down control at the time of slip of the drive wheels 15 by the VSC/TRC is started at the step S25, the target engine rotational number Net (predetermined value) set at the step S26 is adopted. That is to say, when the torque down control is started, drastic decrease in the actual engine rotational number is prevented by adopting the predetermined value of the target engine rotational number Net set in advance, without adopting the target engine rotational number Net set by using the fuel consumption optimal operation-line.

Thereafter, as described above, at the step S21, the target electric generator rotational number of the electric generator 13 is calculated, at the step S22, the electric generator command torque of the electric generator 13 is calculated, at the step S23, the motor command torque of the electric motor 12 is calculated, and at the step S24, the ECUs 22 and 27 control the engine 11, the electric motor 12 and the electric generator 13. In this case, since the main ECU 28 adopts the target engine rotational number Net (predetermined value) set during the torque down control by the VSC/TRC, the torque down is executed by adjusting (decreasing) the electric generator command torque of the electric generator 13 and the motor command torque of the electric motor 12.

Therefore, in the hybrid vehicle according to the present embodiment, as shown in FIG. 4, while travelling, when the drive wheels 15 slip and the VSC/TRC are started to decrease the vehicle required torque Ph at a time point $t_1$, the target engine rotational number Net is determined without using the optimal fuel consumption operation-line, so that the actual engine rotational number does not decrease. Then, when the slip of the drive wheels 15 is resolved and the VSC/TRC are terminated at a time point $t_2$, the electric motor 12 and the electric generator 13 are controlled so as to increase the vehicle required torque Ph at a time point $t_3$, and since the engine rotational number does not decrease at that time, responsiveness of torque up becomes excellent, and when a torque up command is issued, it does not take a long time for the decreased vehicle actual torque to be increased to the vehicle required torque unlike in the conventional case, and the vehicle actual torque may be increased to the vehicle required torque in a short time.

In this manner, in the driving force control apparatus for the hybrid vehicle according to the present embodiment, it is configured that the engine ECU 22 can set the target engine rotational number by using the fuel consumption optimal operation-line based on the operating state of the hybrid vehicle, the main ECU 28 can set the target output torque of the engine 11 and the electric motor 12 based on the operating state of the hybrid vehicle and the target engine rotational number, and the engine ECU 22 and the motor ECU 27 can control the engine 11 and the electric motor 12 based on the target engine rotational number and the target output torque, and when there is the torque down command in the main ECU 28, the engine ECU 22 sets the target engine rotational number so as to be higher than the target engine rotational number set by using the fuel consumption optimal operation-line. Alternatively, the setting process of the target engine rotational number using the fuel consumption optimal operation-line is prohibited.

Therefore, the actual engine rotational number does not decrease, the maximum value of the output torque of the vehicle, which can be output, becomes larger, and followability of the torque up control after the torque down control is improved, so that controllability can be improved.

Also, the engine ECU 22 is configured to set the target engine rotational number within the range set in advance when there is the torque down command, so that significant increase and decrease in the target engine rotational number are prevented and the responsiveness can be improved. Also, in this case, control of the engine ECU 22 becomes easier when the current target engine rotational number is maintained, so that a cost thereof can be reduced.

In the present embodiment, it is configured that the target engine rotational number is set so as to be higher than the target engine rotational number set by using the fuel consumption optimal operation-line or the setting process of the target engine rotational number using the fuel consumption optimal operation-line is prohibited, at the time of the torque down control by the traction control to inhibit the slip of the drive wheels 15 and the stability control to inhibit the skid thereof. Therefore, traveling stability in addition to the drive controllability of the vehicle can be improved.

INDUSTRIAL APPLICABILITY

As described above, the driving force control apparatus for the hybrid vehicle according to the present invention is to improve the followability of the torque up control after the torque down control, and is useful when applied to the hybrid vehicle capable of traveling with the engine and the electric motor as the power sources.

The invention claimed is:

1. A driving force control apparatus for a hybrid vehicle capable of traveling with an engine and an electric motor as power sources, comprising:
   a target engine rotational number setting unit that sets a target engine rotational number by using a fuel consumption optimal operation-line set in advance based on an operating state of the vehicle;
   a torque setting unit that sets target output torque of the engine and the electric motor based on the operating state of the vehicle and the target engine rotational number; and
   a torque controlling unit that controls the engine and the electric motor based on the target engine rotational number and the target output torque, wherein
   when there is a torque down command in the torque setting unit, the target engine rotational number setting unit maintains the target engine rotational number to a current target engine rotational number.

2. The driving force control apparatus for the hybrid vehicle according to claim 1, wherein when there is the torque down command in the torque setting unit during torque down control, the target engine rotational number setting unit maintains the target engine rotational number to the current target engine rotational number.

* * * * *